US006982716B2

(12) United States Patent
Kulas

(10) Patent No.: US 6,982,716 B2
(45) Date of Patent: Jan. 3, 2006

(54) USER INTERFACE FOR INTERACTIVE VIDEO PRODUCTIONS

(76) Inventor: Charles J. Kulas, 244 Texas St., San Francisco, CA (US) 94107

( * ) Notice: Subject to any disclaimer, the term of this patent is extended or adjusted under 35 U.S.C. 154(b) by 388 days.

(21) Appl. No.: 10/194,147

(22) Filed: Jul. 11, 2002

(65) Prior Publication Data

US 2004/0008227 A1    Jan. 15, 2004

(51) Int. Cl.
*G06T 13/00*    (2006.01)
(52) U.S. Cl. .............................. 345/473; 463/7; 463/31
(58) Field of Classification Search ................ 345/473, 345/710, 823, 700, 772, 716; 463/7, 31; 434/322
See application file for complete search history.

(56) References Cited

U.S. PATENT DOCUMENTS

| 4,333,152 A | * | 6/1982 | Best ........................... 345/716 |
| 5,358,259 A | * | 10/1994 | Best ........................... 463/31 |
| 5,607,356 A | * | 3/1997 | Schwartz ..................... 463/31 |
| 5,613,909 A | * | 3/1997 | Stelovsky ..................... 463/1 |
| 2003/0077559 A1 | * | 4/2003 | Braunberger et al. ........ 434/322 |

OTHER PUBLICATIONS

Feedback Mechanism for Use with Visual Selection Methods. Aoki et al. US 2003/0016253 A1.*

* cited by examiner

*Primary Examiner*—Kee M. Tung
*Assistant Examiner*—Peter-Anthony Pappas
(74) *Attorney, Agent, or Firm*—Charles J. Kulas

(57) ABSTRACT

The invention allows a user to select a text option displayed on a display device during playback of an interactive production. The action of the production continues regardless of whether the user selects an option. Options expire after an active time interval. After the active time interval the option can no longer be selected and is considered "expired." Expired options are eventually removed from the display and new options appear. A time indicator is used to alert the user that an option is going to expire. Any type of time indicator can be used including a numerical readout of the remaining active time for an option, an animation that shows that the option is about to expire, a symbol, color change, intensity change, animation, etc., can be used as a time indicator.

13 Claims, 2 Drawing Sheets

USER INTERFACE FOR INTERACTIVE VIDEO PRODUCTIONS

BACKGROUND OF THE INVENTION

This invention relates in general to electronic display systems and more specifically to a user interface for a system to present an interactive production.

Traditional television shows and movies are not interactive. The viewer is not permitted to influence the actions displayed on a screen or display device. However, these types of traditional productions can portray any type of abstract or physical action or imagery. In other words, there are no limitations to what the traditional, passive (i.e., non-interactive), production can portray.

On the other hand, computer games are highly interactive. The user can drive a car, assume the role of a character and direct the character's movements and actions, etc. However, computer games severely limit the types of actions that a player, or user, can perform in the game. For example, although a user may be a character, the user's actions are typically limited to running around and shooting, or killing, other characters or monsters in the game. Diverse and unlimited types of actions that are possible in the real world, and that are portrayed in movies, surpass the capabilities of today's computer games.

Attempts have been made to create an entertainment form that is somewhere in-between movies and computer games. Some of these games are referred to as "adventure" games. Early adventure games permitted a user to use a limited vocabulary of plain written or spoken words to describe actions. A simple parser interpreted the user's typed commands and reacted to the user's actions. Although this approach gave the illusion of versatile interaction, the user quickly discovered that the number of possible verbs and nouns, corresponding to manipulations and objects in the game, was very limited.

Other approaches allow the user to have complete freedom in very limited categories. For example, a user may be allowed to move a character anywhere at any time within the game. The user can indicate the direction of movement of a character by using a pointing device, such as a mouse, to indicate a point for a character to move toward. The user typically clicks somewhere in a rendered scene displayed on a display device. The character is animated to move to the indicated location. However, a player can quickly become bored with free movement ability if the player becomes confused as to what to do next. Especially if the player must be at a certain location within the game to perform a needed action and the player does not know how to get to the location, or does not even know that a specific action is needed to continue with the game's storyline.

Sometimes a user is given free ability to choose an item from among a selection of items. The user can carry and use the item at a later time. However, the types of items that are presented to the user are very limited. For example, if the game is a first-person shooter (FPS) game then the items are typically weapons, armor, health enhancements and ammunition. Such games use predictable items because gamers are familiar with such items and know how to use them within the game. However, this approach prevents new, subtle and artistic uses of objects in an interactive production. For example, a user would not know that a gun could be used to prevent a door from closing. Or that letters can be inscribed into a bullet to deliver a message. Such choices are difficult to convey to a player in a way that is entertaining and that fits within a story.

Game designers have tried to mask the player's inability to perform varied actions by limiting the character's reasonable choices according to the game's storyline. For example, a game may permit a player to have a conversation with other characters in the game by letting the player select one of multiple possible sentences to speak to another character. However, games that use such an approach typically stop the games action while the conversation is taking place. Such pausing of action detracts from the game's realism, but is necessary to make sure the player follows closely within the storyline and makes necessary moves or acquires needed information to understand the story.

Where multiple-choice dialogue is provided to the player, the game usually allows the player to speak every one of the possible choices before progressing so that the game designers can be sure that the player eventually says the correct phrase and receives desired information or performs a desired action. The illusion of the player carrying on an actual "conversation" with another in-game character is destroyed by the repeated request to select one of multiple sentences, and by pausing the game action while a dialogue is carried out.

Thus, it is desirable to provide an improved interface for an interactive production.

SUMMARY OF THE INVENTION

The invention allows a user to select an option displayed on a display device during playback of an interactive production. The action of the production continues regardless of whether the user selects an option. Options expire after an active time interval. After the active time interval the option can no longer be selected and is considered "expired." Expired options are eventually removed from the display and new options appear. A time indicator is used to alert the user that an option is going to expire.

Any type of time indicator can be used including a numerical readout of the remaining active time for an option, an animation that shows that the option is about to expire, a symbol, color change, intensity change, animation, etc., can be used as a time indicator.

In one embodiment the invention provides a method for accepting input for an interactive production, the method executing on a processor coupled to a display screen and a user input device, the method comprising displaying a plurality of text options on the display screen; providing a time indicator in association with at least one of the plurality of text options, wherein the time indicator indicates that the associated text option is about to expire so that it can no longer be selected; and accepting a signal from the user input device to indicate a selected text option.

DETAILED DESCRIPTION OF A PREFERRED EMBODIMENT

Figure 1:
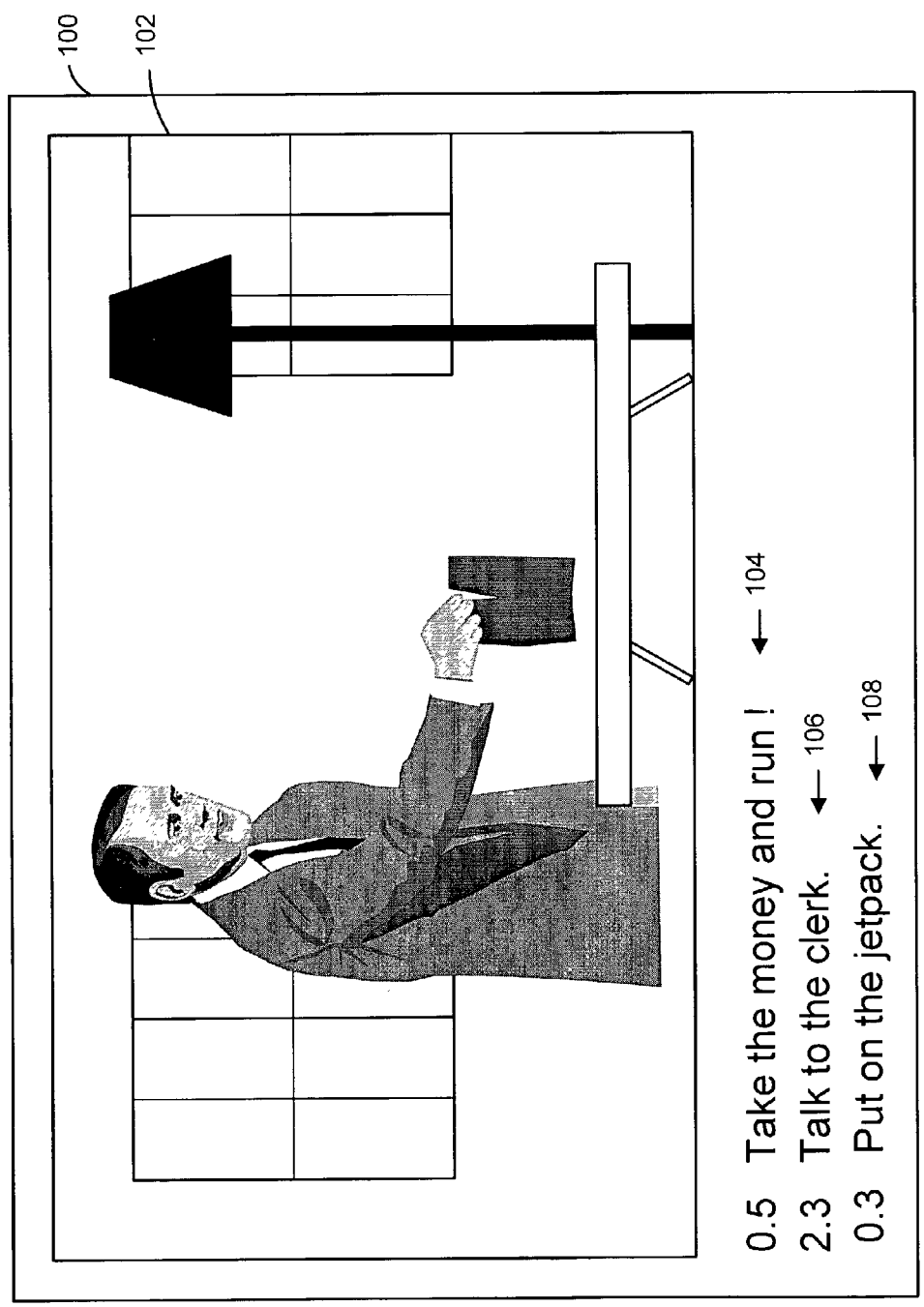
FIG. 1 illustrates a screen display of an interactive production according to a preferred embodiment of the invention.

In FIG. 1, screen 100 is part of a display device such as a computer monitor, television screen, liquid crystal display (LCD), thin film transistor (TFT) display, etc. In general, any type of display device is suitable for use with the present invention including stereoscopic, virtual reality, projection, cathode ray tube, etc. Part of screen 100 is used to display visual imagery of an interactive production such as imagery 102 in FIG. 1. Text options are shown below the imagery at 104, 106 and 108. Although specific layouts of screen displays are discussed in connection with a preferred embodiment, any type of layout, aspect ration, or screen utilization can be suitable. For example, the imagery can occupy all of a display screen and the text options can be overlayed onto the imagery. The text options can be above, below, alongside, or otherwise adjacent to the imagery on a single display screen. The text options can also be displayed on separate display devices.

Figure 2:
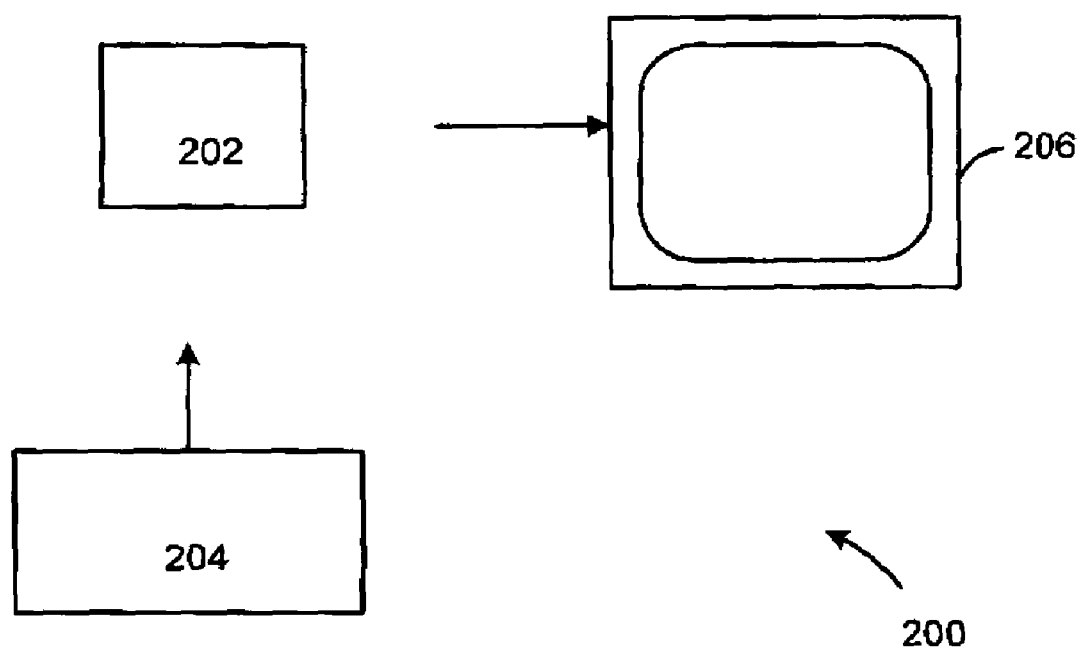
FIG. 2 shows basic subsystems in a computer game.

FIG. 2 shows an exemplary system 200 including processor 202, user input device 204 and display screen 206 (e.g., screen 100 of FIG. 1).

A preferred embodiment of the invention uses space below imagery of the interactive production to display the text options. In FIG. 1, a user is presented with three text options as "Take the money and run" 104, "talk to the clerk" 106 and "walk over to the window" 108. In general, any type of text, alphanumeric, or symbolic descriptions or cues can be displayed as selectable options by a user. For example, different languages can be used. Symbols such as a stop sign, gun, mouth, etc., can be used to, respectively, indicate stopping an action, using an object such as a gun, talking to a character, etc. The symbols can be displayed anywhere on the display screen, or on additional display screens or in or with any type of display device.

In preferred embodiment the action does not stop while the options are displayed. The user is able to select an option as long as the option is displayed on the screen. A time indicator, or expiration indicator, is provided so that the user knows approximately when an option will become unavailable. Any type of time indicator can be used including visible, audible, tactile, etc., types of indication. A preferred embodiment uses a visual animation of the text of an option to indicate that the option is about to expire. Text is shown in solid intensity as long as it is selectable. A few seconds before an option expires the option begins to flash or pulse so that the text changes in intensity. When expiration of the option is imminent, the text on the screen corresponding with the option slowly fades to the background color (e.g., black) until the option is completely invisible on the screen and is no longer selectable.

The user can select an option at any time that an option is visible including when the option is pulsing and fading. After the option has disappeared another option can be displayed in the space made available. Multiple options can be displayed at the same time.

Note that any type of indicator can be used. For example, other embodiments can use a numerical indication of the amount of time left to select the option. The numerical indication can change in real time to count down the seconds, milliseconds, etc., until the option expires. The text of the option can change colors to indicate that the option is about to expire. Animation, such as a progress bar, burning fuse, hourglass, etc., can be used adjacent to an option to indicate that the option is about to expire. Many other forms of indication will be apparent and are suitable for use with the invention.

When a user selects an option, the interactive production proceeds accordingly so that the user's selection influences the action of the production. Any type of production can be used with the invention. For example, full-motion video (FMV) from a CDROM or DVD or other medium can be used to branch to different sequences depending on a user selection. Computer generated (CG) animation can be used to change the action based on user selections. A combination of FMV and CG productions can be used. In general, any type of visual, aural, tactile or other production can be used with the invention.

Note that selection of an option can be achieved in any manner. A preferred embodiment uses a pointing device, such as a mouse or trackball, to move a cursor in proximity to an option's visual representation (e.g., text) on a display screen. Other embodiments can use different pointing mechanisms such as a touch screen, eye tracker, data glove, light pen, etc. In a future embodiment it is anticipated that voice recognition will be used to identify an option that a user desires to select. For example, the user can say "take 2" to select a second option on the screen. Or the user can recite part of the text of an option to indicate that the option is to be selected. Other approaches are possible.

Although the invention has been described with respect to specific embodiments thereof, these embodiments are merely illustrative, and not restrictive, of the invention. Thus, the scope of the invention is to be determined solely by the appended claims.

What is claimed is:

1. A method for accepting input for an interactive production, the method executing on a processor coupled to a display screen and a user input device, the method comprising generating a visual presentation on the display screen and performing the following steps while the visual presentation continues playing back without pause:

displaying a plurality of text options on the display screen, wherein two or more text options are selectable at a given time and are displayed simultaneously;

providing a visible time indicator on the display screen in association with at least one of the plurality of text options, wherein the time indicator indicates when the associated text option will expire so that the text option can no longer be selected;

accepting a signal from a user input device to select a text option; and changing the playing back of the visual presentation in accordance with the selected action.

2. The method of claim 1, further comprising checking whether the selected text option has expired and, if not, causing a change in the interactive production in response to the selected text option.

3. The method of claim 1, wherein a time indicator includes a numerical indication of a duration of time in which an associated text option will be selectable.

4. The method of claim 1, wherein a time indicator includes a change in intensity of a text option.

5. The method of claim 1, wherein a time indicator includes flashing an intensity of a text option.

6. The method of claim 1, wherein a time indicator includes a change in the coloring of a text option.

7. The method of claim 1, wherein a time indicator includes an animation.

8. The method of claim 7, wherein a time indicator includes animating a text option.

9. The method of claim 7, wherein a time indicator includes moving an image in association with a text option.

10. The method of claim 1, wherein first and second text options include first and second sentences, respectively, displayed at first and second locations on the display screen for first and second predetermined intervals of time.

11. An apparatus for accepting input for an interactive production, the apparatus comprising a processor coupled to a display screen and a user input device for executing instructions;

one or more instructions for displaying a plurality of text options on the display screen, wherein two or more text options are selectable at a given time and are displayed simultaneously;

one or more instructions for providing a visible time indicator on the display screen in association with at least one of the plurality of text options, wherein the time indicator indicates that the associated text option is about to expire so that it can no longer be selected;

one or more instructions for accepting a signal from the user input device to indicate a selected text option during ongoing playing of the interactive production; and one or more instructions for modifying playing of the interactive production in response to the selected text option.

12. A computer readable medium including instructions executable by a processor coupled to a display screen and a user input device, the computer readable medium including one or more instructions for displaying a plurality of text options on the display screen, wherein two or more text options are selectable at a given time and are displayed simultaneously;

one or more instructions for providing a providing a visible time indicator on the display screen in association with at least one of the plurality of text options, wherein the time indicator indicates that the associated text option is about to expire so that it can no longer be selected;

one or more instructions for accepting a signal from the user input device to indicate a selected text option during ongoing playing of an interactive production; and one or more instructions for modifying playing of the interactive production in response to the selected text option.

13. A computer data signal embodied in a carrier wave comprising instructions executable by a processor coupled to a display screen and a user input device for executing instructions including one or more instructions for displaying a plurality of text options on the display screen, wherein two or more text options are selectable at a given time and are displayed simultaneously;

one or more instructions for providing a visible time indicator the display screen in association with at least one of the plurality of text options, wherein the time indicator indicates that the associated text option is about to expire so that it can no longer be selected;

one or more instructions for accepting a signal from the user input device to indicate a selected text option during ongoing playing of an interactive production; and one or more instructions for modifying playing of the interactive production in response to the selected text option.

\* \* \* \* \*